United States Patent [19]

Cazzaniga

[11] Patent Number: 4,739,925

[45] Date of Patent: Apr. 26, 1988

[54] POWER DRIVEN VALVE ACTUATOR

[75] Inventor: Luigi Cazzaniga, Milan, Italy

[73] Assignee: Sparco, Inc., Cranston, R.I.

[21] Appl. No.: 935,031

[22] Filed: Nov. 26, 1986

[51] Int. Cl.[4] .............................................. G05D 15/00
[52] U.S. Cl. .......................... 236/68 R; 236/DIG. 16
[58] Field of Search ...... 236/68 R, DIG. 5, DIG. 16, 236/100; 251/11; 60/523

[56] References Cited

U.S. PATENT DOCUMENTS

| | | | |
|---|---|---|---|
| 1,643,523 | 9/1927 | Sauvage | 60/523 X |
| 1,742,091 | 12/1929 | Otto | 236/DIG. 16 |
| 2,572,386 | 10/1951 | Ray | 137/139 |
| 3,019,986 | 2/1962 | Schoerner | 236/12 |
| 3,164,365 | 1/1965 | White et al. | 251/335 |
| 3,326,510 | 6/1967 | Kolze | 251/11 |
| 3,400,906 | 9/1968 | Stocklin | 236/68 R |
| 3,540,479 | 11/1970 | Thompson | 137/625.5 |
| 3,709,431 | 1/1973 | Channell et al. | 236/68 R |

Primary Examiner—William E. Wayner
Attorney, Agent, or Firm—Lane & Aitken

[57] ABSTRACT

A power driven valve actuator includes a thermostatic device which is movably supported in a housing to accommodate overtravel of a thrust member against the stem of the valve resulting from excess expansion of a thermostatic element enclosed in the thermostatic device and heated by a heating device. Movement of the thermostatic device trips a dust-tight switch to interrupt power to the heating device, and a spring engaging the thermostatic device returns the thermostatic device to a starting position, so that whenever heat is called for by the thermostat, the thermostatic device cycles in a reciprocating motion within the housing after the valve has been fully opened. The heating device comprises an electric resistance heating element placed in contact with a thermal enclosure of the thermostatic element and covered by an insulating material.

15 Claims, 2 Drawing Sheets

POWER DRIVEN VALVE ACTUATOR

BACKGROUND OF THE INVENTION

The present invention relates to valve actuators and, more particularly, to electrically operated actuators for mounting on zone valves in heating systems.

Zone valves are installed in various places in lines carrying a heated fluid to space units in a structure to be heated in order to control the flow of the heated fluid to the space units in response to the temperature in the space. In many instances, the zone valves are controlled by electric valve actuators which are triggered by thermostats in order to open or close individual zone valves and, thereby, initiate or terminate the flow of a heated fluid to the space units associated with a particular zone valve and thermostat. Zone valves ordinarily have a reciprocative valve element which is biased to a closed position against its seat by a spring. The valve actuators have a thermostatic device including a reciprocating thrust stem which engages the valve stem and is capable of forcing the valve element open by the operation of a thermostatic element containing a wax or other material which expands upon the application of heat. Typically, when a thermostat senses a need for additional heat, it completes a circuit energizing a heating device, for example, an electric resistance heating element, positioned in heat exchange relationship with the thermostatic element. The heating device heats the thermostatic element so that the thermostatic element expands, overcoming the bias of the valve spring and opening the valve.

Such known actuators have been known to encounter difficulties if an obstruction occurs on the seat of the zone valve or below the seat element. The obstruction can prevent the valve from fully closing or opening and, in either case, can cause electricity to continue to flow to the electric resistance heating element, which in turn causes the thermostatic element to overheat and fail, usually by breaking through the top of a cup containing the thermostatic element. For this reason, filters have been provided for the zone valves to prevent dirt or an obstruction from accumulating on the valve seat or lodging below the seat element. In addition, the electric resistance heating element usually comprises a bare resistance wire wound around the cup and, as a result, leaking wax from a failed thermostatic element has been known to flow down from the top of the cup onto the electric resistance element and catch fire from the heat generated by the element. The problem is compounded in some cases by the use of a flammable plastic cover for the actuator, which fails to contain the heat and can add fuel to the fire rather than contain it. Such covers are usually open to permit heat to dissipate, but the openings permit moisture to enter and frequent temperature changes to occur, which prematurely age rubber elements in the thermostatic elements. Furthermore, the actuators according to the prior art employ open switches in the actuator housing, which are not dust-tight. Consequently, the actuators have failed to operate in dirty environments due to dirt preventing the closing of exposed switch contacts. Moreover, since the thermostatic elements remain hot and exert a force on the thrust stem for some time after they are heated, the thrust stems have been known to shoot out of an actuator which was being removed from the valve by a workman and cause injury.

Manual valve actuators associated with known power actuators directly engage the valve stem and will cause the thermostatic element to overheat and fail if power operation of the actuator is restored while the manual actuator holds the valve open.

SUMMARY OF THE INVENTION

In order to overcome the drawbacks of prior art devices, the actuator according to present invention includes a mechanism for accommodating additional expansion of the thermostatic elements after the zone valve is open. Specifically, the entire thermostatic device is movable away from a base plate in its housing which is secured adjacent a casing of the valve, and is biased toward the base plate by an actuator spring which requires greater force to be overcome than the spring of the zone valve does. Thus, initial expansion of the thermostatic element results in movement of the thrust stem against the valve stem and the separation of the valve stem from its seat. Additional expansion of the thermostatic element is prevented by a collar secured to the thrust stem, but is accommodated by the movement of the thermostatic device away from the base plate, and therefore away from the valve, against the bias of the actuator spring. As the thermostatic device moves away from the valve, a switch in an electrical circuit to a heating device for the thermostatic element is opened, thereby cutting off power to the heating device. The collar also prevents the thrust stem from popping out of the housing when the actuator is removed from the valve.

Since the movement of the thermostatic device is not affected by dirt in the valve, there is no danger of the current to the heating device being kept on, nor any danger of the associated thermostatic element failure and threat of fire. Consequently, there is not as great a need to provide the zone valves with filters. Therefore, the termination of the power to the heating device is assured, and the thermostatic element cools and contracts, allowing the actuator spring to move the thermostatic device back against its base plate. In the latter position, the switch in the heating device circuit closes, heating the thermostatic element, causing it to expand and again to move the thermostatic device away from its base plate. This cycling continues as long as the thermostat calls for heat in the zone associated with the zone valve. The cycling is accommodated by the reciprocating movement of the thermostatic device rather than by repeated movement of the actuator thrust stem and the valve stem, which tends to wear down the seals or sealing bellows, if used. The heating device comprises an electric resistance element in contact with an enclosure for the thermostatic element to facilitate quick heating of the element. A covering, such as a coating of an insulating material, is placed over the electric resistance element to eliminate the hazard of fire from foreign material contacting the electric resistance element. The switch connected with the heating device and a switch connected with a circulating pump are in dust-tight enclosures to assure reliable operation of the actuators, even in dirty environments.

DETAILED DESCRIPTION OF THE PREFERRED EMBODIMENT

Figure 1:
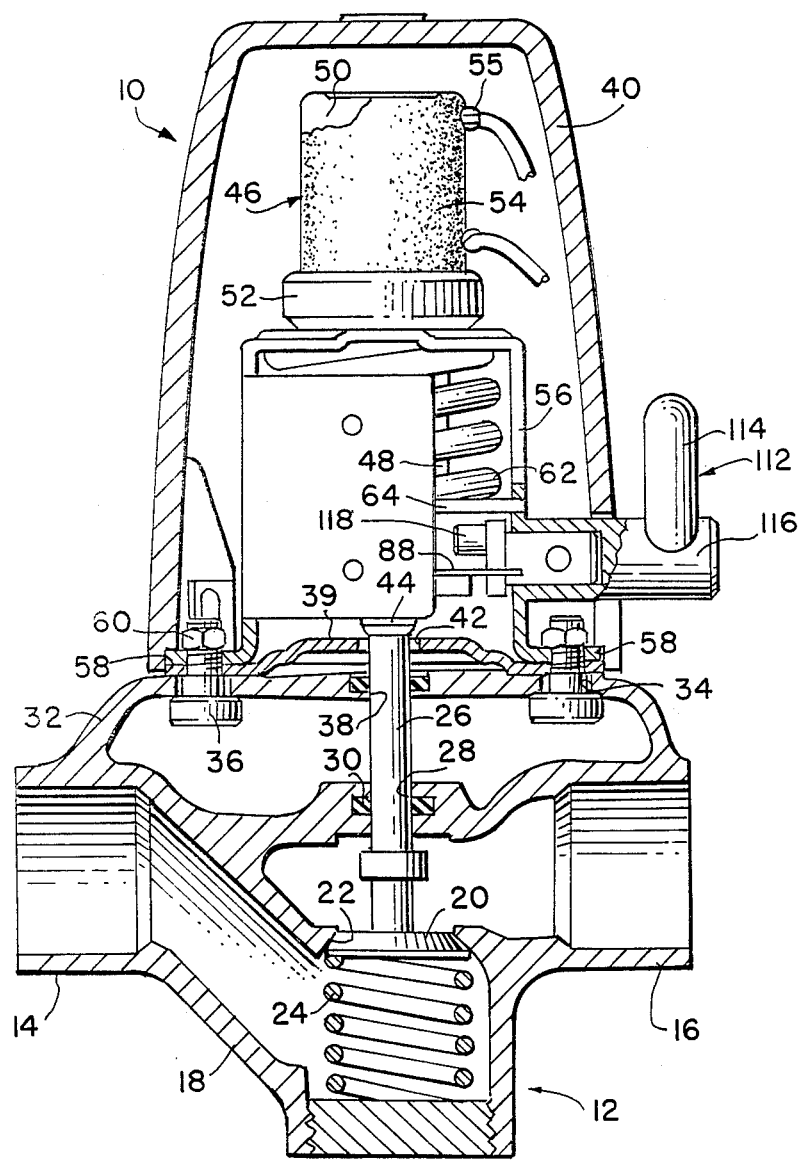
FIG. 1 is a cross-section, taken from one side, of an actuator according to the present invention mounted on a zone valve.

As can be seen from FIG. 1, the valve actuator according to the present invention, which is designated generally by the reference numeral 10, is adapted to be mounted on a zone valve 12 which controls the flow of a heated fluid to a portion of a heating system, as is known in the art. The zone valve 12 includes an inlet 14 for receiving the heated fluid from a heater and an outlet 16 for directing the flow of the heated fluid to one or more space heating units. The zone valve 12 typically includes a casing 18, a reciprocative valve element 20 biased against a valve seat 22 by a spring 24, and a valve stem 26 in engagement with the seat element 20. The valve stem 26 extends from the seat element 20 through a bore 28 in the valve casing 18 for engagement with the actuator 10. A sealing device 30, such as an O-ring or bellows, is provided in the bore 28 around the valve stem 26 to prevent leakage of the fluid flowing through the valve 12. The valve casing 18 includes a formation 32 adjacent the bore 28 for allowing the actuator 10 to be releasably secured to the valve casing. For the zone valve 12 illustrated in FIG. 1, the formation 32 includes a surface defining bayonet slots 34 for receiving locking screws 36 attached to and projecting from the actuator 10 so that the actuator can be secured to or removed from the valve casing 18 with a twist. The formation also includes an opening 38 to allow the valve stem to pass and a sealing device in the opening.

The locking screws 36 of the actuator 10 are secured to a base plate 39 which, in turn, is fixed to an unapertured cover 40 of the actuator at a bottom, open end of the cover by rivets or other suitable fasteners to define a housing of the actuator. The cover 40 is made of a non-combustible material, such as aluminum, steel, zinc or some other metal or other nonflammable material. The base plate 39 includes a central aperture 42 into which the valve stem 26 may extend to engage the end of a thrust stem 44 of the actuator 10. An end of the thrust stem 44 distal to the base plate 39 and to the valve stem 26 extends into a thermostatic device 46, which is conventional and commercially available from a number of companies, including Caltherm Corp. of Columbus, Ind. The thermostatic device 46 is responsive to the application of heat to move the thrust member 44 in a direction for moving the valve element 20 away from the seat 22. The thermostatic device 46 includes a guide 48 which receives the thrust stem, and a cup 50 mounted on the top of the guide 48 above a flange 52, where the cup 50 and the guide 48 are joined. The cup 50 and the guide 48 define an enclosure having a cylindrical reservoir containing a material, such as a wax, which melts and expands upon the application of heat, thereby defining a thermostatic element. The force of the expanding wax acts against a plug of an elastomeric material positioned within the guide. The plug has an end which abuts the end of the thrust stem 44, which is within the enclosure and distal to the base plate 39, and forces the thrust stem 44 against the valve stem 26 as the material of the thermostatic element expands. As is also conventional, a heating device 54 for heating the thermostatic element is provided around the cup 50 in heat exchange relationship with the thermostatic element. However, in the actuator 10 according to the present invention, the heating device 54 departs from prior heating devices by employing a coating of insulating material, such as polytetrafluoroethylene, to cover an electric resistance heating wire wound around the cup 50, in contact with the exterior surface of the cup, and thereby to greatly reduce the risk of fire. Leads are connected to the wire at connections 55 for supplying power to the heating device 54. A ceramic core resistance element can also be used, but it is somewhat slower in heating the thermostatic element.

Figure 2:
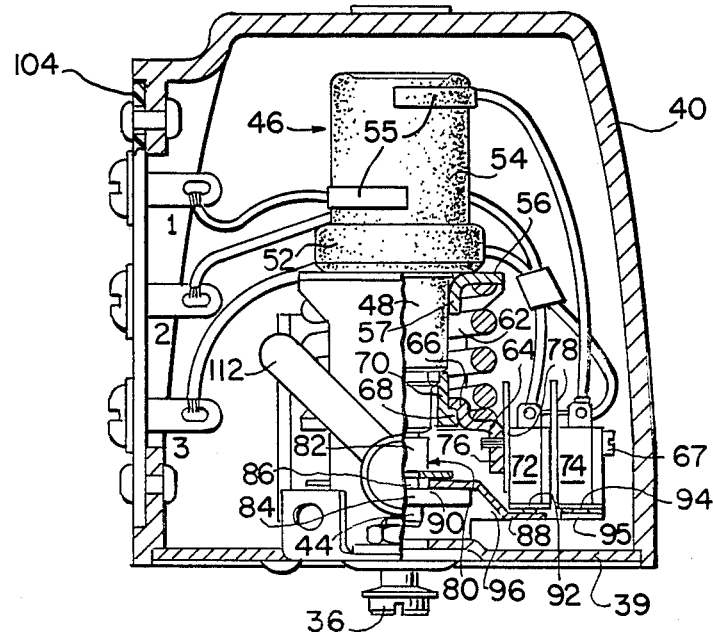
FIG. 2 is a cross-section taken from the front of the actuator of FIG. 1.

As can be seen from FIGS. 1 and 2, the enclosure comprising the guide 48 and the cup 50 of the actuator 10 is supported within the housing by an inverted U-shaped bridge member 56 having an opening 57 through which the enclosure extends for movement relative to the bridge member 56. The ends of the "U" include flanges 58 defining openings so that they fit over interior ends of the locking screws 36 and are locked in place by nuts 60. The flange 52 at the juncture between the cup 50 and the guide 48 of the thermostatic device 46 rests on the bridge member 56 around the opening 57 and is biased against the bridge member by a spring 62 which is compressed between a surface of the bridge member 56 opposite the surface supporting the flange 52 and a drive cup 64, or drive flange, which is secured around the guide 48 of the thermostatic device 46 at a level spaced from the flange 52, adjacent the end of the enclosure from which the thrust stem 44 projects.

As can best be seen from FIG. 2, in the embodiment illustrated, the drive cup 64 includes a radially inwardly extending lip 66 engaging a shoulder 68 defined at the bottom end of the guide 48 on a lock washer 70 connected to the rest of the guide. A pair of snap-acting switches 72 and 74 in individual dust-tight enclosures is secured to a flange 76 depending from the drive cup 64 by fasteners, such as screws 67, one of which is shown. Small sheets 78 of insulating material are positioned between the two switches, and between the switches and the driving cup 64. Spaced slightly inward from the end of the thrust stem 44 adjacent the valve stem 26 is a collar 80 affixed to the thrust stem. The collar includes a hub 82, a disk 84 extending radially from one end of the hub 82, and a groove 86 defined in the hub adjacent the disk 84. A switch actuating member 88 includes an aperture in which the hub 82 is received, the switch actuating member being supported by the disk 84 and locked in place against the disk by a lock washer 90 received in the groove 86. The switch actuating member 88 includes a radially extending portion projecting under the enclosed switch 72 for engagement with a switch operating button 92. In the embodiment illustrated, the button-engaging portion of the switch actuating member 88 is offset from the portion of the switch actuating member engaging the disk 84. The direction of movement of the switch button 92 is parallel to the direction of movement of the thrust element 44, so that movement of the thrust element 44 causes actuation of the switch 72. The switches 72 and 74, the switch actuating member 88, the thrust stem 44 and the valve stem 26 are all arranged so that, when the zone valve 12 is in its closed position, the valve stem 26 supports the thrust stem 44 at a position in which the switch actuating member 88 depresses the switch button 92. The switch 74 has an operating button 94 which is held in a depressed position when the thermostatic device 46 is in a starting, or rest, position at the extent of its travel closest to the base plate 37. The switch button 94 is depressed by a flange 95 projecting from an arm 96 extending from one leg of the U-shaped bridge member 56. The switches 72 and 74 are positioned together with the operating buttons 92 and 94 extending from their dust-tight enclosures in the same direction, toward the base plate 39, and terminating in the same plane transverse to the axis of the thrust member 44.

The disk 84 is larger than the opening 42 in the base plate 39 and thereby prevents the thrust stem 44 from popping out of the housing when the actuator 10 is removed from the zone valve 12. The engagement of the disk 84 with the base plate 39 also defines the limit of travel of the thrust stem 44 toward the zone valve 12.

Figure 3:
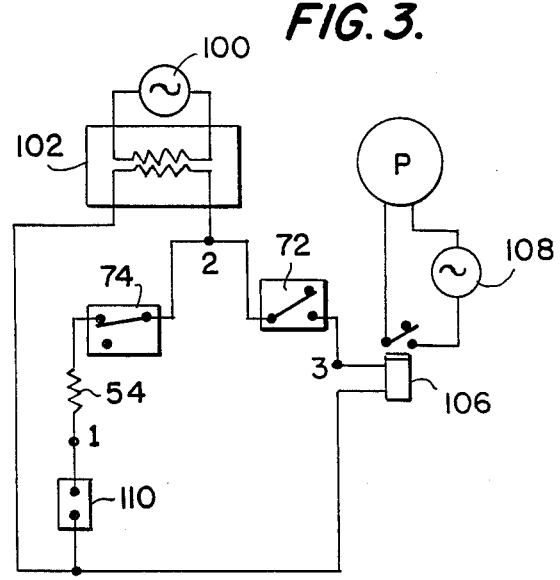
FIG. 3 is wiring diagram for controlling the actuator.

As can be seen from FIG. 3, the switch 72 is connected in a circuit providing power to the motor for a pump P, which is mounted for circulating the heated fluid to the space heating units. Power for the circuit is provided by a voltage source 100 acting through a transformer 102 to reduce the voltage from 110 volts to about 24 volts. A lead from the transformer is connected to the switch 72 through a terminal, for example, terminal 2, provided on a terminal board 104 along one side of the cover 40 of the housing (FIG. 2). Also included in the circuit, by connection to terminal 3 on the terminal board 104, is a relay 106, which connects the motor driving the pump P to a voltage source 108 when current flows through the circuit. The terminals 1, 2 and 3 extend through a wall of the housing for connection internally to various components of the actuator 10 and for connection externally to outside elements. The switch 72 is biased internally to a normally closed position, but is held open, as shown in FIG. 3, by the switch actuating member 88 when the zone valve 12 is closed. Thus, when the valve 12 is closed, the switch 72 is open and the circulating pump P does not operate. The switch 74 is connected in a circuit supplying power to the heating device 54 around the cup 50. This circuit also receives its power from terminal 2 and includes the heating device 54 and the thermostat 110 connected in series with the switch 74. A lead extends from the thermostat 110 to terminal 1 on the terminal board 104. The switch 74 is internally biased to a normally open position but is held closed by the flange 95 projecting from the U-shaped bridge member 54. The flange 95 holds depressed the button 94 of the switch 74 to maintain the switch in a closed condition whether the zone valve 12 is open or closed. With the switch 74 closed, power flows to the heating device 54 whenever heat is called for by the thermostat 110, which is associated with the space heating units controlled by the zone valve 12, since the thermostat 110 completes the circuit in such a condition.

In case the electrically operated valve actuator 10 becomes inoperative because of a power failure or other reason, a lever 112 is provided for manual actuation of the zone valve 12. The manual lever 112 includes a handle 114 on the exterior of the actuator housing, the handle 114 being secured in a shaft 116 extending through an opening in the housing and journalled for rotation in an aperture in one leg of the bridge member 56, as can be seen from FIG. 1. The shaft terminates just inside the leg of the bridge member 56 in a face having an eccentrically mounted pin 118 engageable with a portion of the switch actuating member 88 resting upon the disk 84. The lever handle 114 is movable from a position in which the thrust stem 44 and the thermostatic element are free to operate normally to a position in which the eccentrically mounted pin 118 locks the disk 84 against the base plate 39. In the latter position, the extending portion of the thrust stem 44 forces the valve stem 26 to hold open the valve element 20, and thereby, permit flow through the zone valve 12.

In operation, assuming an initial system condition in which the space heating units are supplying sufficient heat to the area controlled by the valve 12, the valve is closed, the circulating pump P is off, and the thermostat 110 associated with the space does not sense a need for additional heat. In this condition, the thrust element 44 of the actuator 10 is in a position so that the switch actuating member 88 holds the button 92 of the switch 72 depressed, and the flange 95 on the arm 96 extending from the U-shaped bridge member 56 holds the button 94 of the switch 74 depressed. When the temperature in the space falls to a predetermined level, the thermostat 110 senses the need for additional heat and closes the circuit in which it is connected to send power to the heating device 54 around the cup 50 of the thermostatic device 46. Since the buttom 94 of the switch 74 is depressed, the switch 74 is closed and power flows to the heating device 54 and melts the material of the thermostatic element. As the heated material expands, it moves the thrust element 44 toward the valve stem 26, opening the valve element 20 and permitting heated fluid to flow through the zone valve 12 to the space controlled by the thermostat 110. The movement of the thrust stem 44 toward the valve stem 26 also releases the button 92 of the switch 72, thereby closing the switch 72 and allowing power to flow to the circulating pump P to move the heated fluid through the zone valve 12 and into the space heating units in the space controlled by the thermostat 110.

Because the expansion of the material of the thermostatic element cannot be controlled precisely enough, there is a limited amount of overtravel of the thrust stem 44 toward the valve stem 26. When the valve 12 is fully open, it cannot accomodate the overtravel of the thrust stem 44 since the valve element 20 and the valve stem 26 are prevented from further movement by, for example, complete compression of the valve spring 24. As a result, additional expansion of the material of the thermostatic element tends to substantially increase the forces acting on the valve 12 and the valve actuator 10. However, in the valve actuator 10 according to the present invention, increased forces are prevented from building by the movement of the thermostatic device 46 away from its base plate 39. The expanding material of the thermostatic element, which can move the thrust stem 44 down no farther due to, for example, the engagement of the disk 84 with the base plate 39, instead moves the enclosure, including the cup 50 defining the reservoir for the thermostatic element, upward and with it the guide 48, the locking washer 70, the driving cup 64 and the switches 72 and 74. Because the switch 74 moves upward and the flange 95 which depresses the switch button 94 remains stationary, since the flange 95 is an integral part of the U-shaped bridge member 56 secured to the base plate 39, this relative movement releases the switch button 94 allowing the switch 74 to open and interrupt the power to the heating device 54 around the cup 50. Therefore, the material of the thermostatic element cools, contracts and allows the actuator spring 62 to return the thermostatic device 46 to a position in which the flange 95 again depresses the button 94 of the switch 74, reconnecting the heating device 54 to the power supply 100 and causing the cycle of movement of the thermostatic device 46 to begin again. This cycling continues as long as the thermostat 110 calls for additional heat.

The actuator spring 62 is stiffer than the valve spring 24, requiring more force to compress it. Therefore, the initial expansion of the material of the thermostatic element causes the compression of the valve spring 24 rather than the actuator spring 62. When the thermostat 110 no longer senses a need for additional heat, it interrupts the flow of power to the heating device 54 even though the switch 94 is closed. Therefore, in such a condition, the return of the switch 74 into engagement with the flange 95 due to the action of the actuator spring 62 does not return power to the heating device 54, even though the switch button 94 is depressed and the switch 74 is closed. The thermostatic device 46 remains in a position in which the flange 52 engages the top of the bridge member 56 and the flange 95 actuates the button 94 on the switch 74. Further cooling and contraction of the material of the thermostatic element results in the valve spring 24 closing the valve element 20 and moving the valve stem 26 and thrust stem 44 toward the actuator 10. This movement closes the zone valve 12 and moves the switch actuating member 88 into engagement with the switch button 92 to interrupt power to the circulating pump P.

Thus, it will be appreciated that as a result of the present invention, problems associated with previous valve actuators have been overcome, and it is contemplated that variations and/or changes in the embodiment illustrated and described herein may be made without departing from the present invention. Accordingly, it is intended that the foregoing description is illustrative only, not limiting, and that the true spirit and scope of the present invention are determined by the appended claims.

I claim:

1. An actuator responsive to a thermostat for controlling the flow of a heating fluid through a valve to a space to be heated, wherein the valve includes a casing, a valve element, a seat, a spring biasing the valve element against the seat, valve stem means for moving the valve element away from the seat against the bias of the spring, and an opening in the casing for permitting contact between the valve stem means and the actuator, comprising:

a housing;
   means for releasably securing said housing to the valve;
   a thrust member for engaging the valve stem means of the valve;
   heat responsive means for moving said thrust member in a direction for moving the valve element away from the seat, said thrust member having a first end within said heat responsive means and a second end projecting from said heat responsive means for engagement with the valve stem means of the valve;
   heating means responsive to the temperature in the space to be heated for heating said heat responsive means;
   first circuit means for connecting said heating means to a source of energy, said first circuit means including a switch;
   means for supporting said heat responsive means for movement relative to said housing;
   an actuator spring in operative engagement with said heat responsive means for biasing said heat responsive means to a starting position; and
   means in engagement with said switch for tripping said switch in response to the movement of said heat responsive means to break said first circuit means and discontinue the flow of energy to said heating means.

2. The actuator of claim 1, wherein a pump is provided for circulating the heating fluid to the space to be heated, and the actuator further comprises second circuit means for connecting the pump to a source of power, said second circuit means including switch means responsive to movement of said thrust member for connecting the pump to the power source.

3. The actuator of claim 1, wherein said housing includes a base plate and a cover secured to the base plate, and said supporting means includes a bridge member attached to said housing, said bridge member defining an opening and said heat responsive means extending through said opening.

4. The actuator of claim 3, wherein said heat responsive means comprises an enclosure having an end from which said thrust member projects, a first flange projects from said enclosure adjacent said end, and said bridge member supports said enclosure at a level spaced from said end, said actuator spring engaging said first flange and said bridge member to bias said first flange away from said bridge member.

5. The actuator of claim 4, wherein said switch is mounted on said heat responsive means.

6. The actuator of claim 2, further comprising means for mounting said switch and said switch means on said heat responsive means for movement with said heat responsive means.

7. The actuator of claim 1, wherein said heat responsive means tends to move said thrust member by an overtravel amount beyond the amount of travel needed to fully open said valve, and said overtravel amount is accommodated by the movement of said heat responsive means relative to said housing.

8. The actuator of claim 1, further comprising means for manually operating the valve.

9. The actuator of claim 1, wherein said heating means for heating said heat responsive means comprises an electric resistance heating element in engagement with said heat responsive means, and a thermal insulating material covering said electric resistance heating element.

10. The actuator of claim 1, wherein said switch includes a dust-tight enclosure.

11. The actuator of claim 2, wherein each of said switch and said switch means includes a dust-tight enclosure.

12. The actuator of claim 2, wherein electric terminals are mounted on said housing, and electric leads extend from said switch, said switch means and said heating device to said electric terminals, said electric terminals extending to the exterior of said housing.

13. The actuator of claim 11, wherein the dust-tight enclosures of said switch and said switch means are secured next to one another and include operating elements extending from their respective enclosures in the same direction.

14. The actuator of claim 13, wherein the operating elements extend in a direction parallel to the direction of movement of the thrust stem.

15. The actuator of claim 14, wherein the operating elements terminate in the same plane perpendicular to the axis of the thrust stem.

* * * * *